(12) United States Patent
Zhang et al.

(10) Patent No.: US 12,000,197 B2
(45) Date of Patent: Jun. 4, 2024

(54) AUTOMATIC DOOR OPERATOR AND METHOD FOR DRIVING THE SAME

(71) Applicant: Assa Abloy Entrance Systems AB, Landskrona (SE)

(72) Inventors: Jingfeng Zhang, Suzhou Jiangsu (CN); Jun Zhao, Suzhou Jiansu (CN)

(73) Assignee: Assa Abloy Entrance Systems AB, Landskrona (SE)

( * ) Notice: Subject to any disclaimer, the term of this patent is extended or adjusted under 35 U.S.C. 154(b) by 329 days.

(21) Appl. No.: 17/441,553

(22) PCT Filed: Mar. 27, 2020

(86) PCT No.: PCT/EP2020/058766
§ 371 (c)(1),
(2) Date: Sep. 21, 2021

(87) PCT Pub. No.: WO2020/201113
PCT Pub. Date: Oct. 8, 2020

(65) Prior Publication Data
US 2022/0205305 A1 Jun. 30, 2022

(30) Foreign Application Priority Data

Apr. 3, 2019 (CN) .......................... 201910267578.6

(51) Int. Cl.
*E05F 15/70* (2015.01)
*E05F 15/60* (2015.01)
*H02M 3/155* (2006.01)

(52) U.S. Cl.
CPC ............ *E05F 15/70* (2015.01); *H02M 3/155* (2013.01); *E05Y 2400/452* (2013.01); *E05Y 2900/132* (2013.01)

(58) Field of Classification Search
None
See application file for complete search history.

(56) References Cited

U.S. PATENT DOCUMENTS

2012/0029701 A1* 2/2012 Houser ................... E05F 15/63
49/358
2012/0267965 A1* 10/2012 Huang .................... H02J 9/005
307/115

FOREIGN PATENT DOCUMENTS

CN 206385975 8/2017
CN 206385975 U * 8/2017 ................ G02J 9/06

OTHER PUBLICATIONS

International Search Report in PCT/EP2020/058766 dated Jul. 2, 2020.

(Continued)

*Primary Examiner* — Jared Fureman
*Assistant Examiner* — Aqeel H Bukhari
(74) *Attorney, Agent, or Firm* — Wissing Miller LLP

(57) ABSTRACT

An automatic door operator is disclosed, including a main control circuit, an actuating unit configured to output torque, and a transmission device. The main control circuit controls operation of the actuating unit to drive a movement of a door leaf through the transmission device. The automatic door operator further includes: a DC power supply configured to supply a DC voltage VDD to the main control circuit; and a standby power switching circuit, connected in series between the DC power supply and the main control circuit, and configured to acquire a switching signal and conduct, or cut off after a preset time period Δt has been elapsed, electric current between the DC power supply and the main control circuit according to the switch signal. A method for driving the automatic door operator is also disclosed. The present disclosure realizes the purpose of saving energy and electricity of the automatic door operator, while increasing the lifetime of the main control circuit.

11 Claims, 5 Drawing Sheets

(56) References Cited

OTHER PUBLICATIONS

Ningyun Zhang et al., Analysis of Active Damping of LCL Filter Used in Single-Phase PV System in Discrete Domain, International Journal of Electronics, vol. 102, No. 6, Jun. 3, 2015.
Maxim: "General Description S Two Current Ranges (Jumper Selectable) S Measure and Read Back Load Current, Load Voltage, and Set Point S Power Source up to 30V S Jumper-Selectable I 2 C Address Setting for the MAX9611 6-Pin Pmod-Compatible Connector (1 2 C) S Secondary Head Allows Daisy-Chaining of Addi", May 1, 2012, pp. 1-9, XP055708124.

* cited by examiner

AUTOMATIC DOOR OPERATOR AND METHOD FOR DRIVING THE SAME

RELATED APPLICATIONS

This application is a 371 of PCT/EP2020/058766, filed on Mar. 27, 2020, published on Oct. 8, 2020 under publication number WO 2020/201113, which claims priority benefits from Chinese Patent Application No. 201910267578.6, filed on Apr. 3, 2019, the disclosure of which is incorporated herein by reference.

TECHNICAL FIELD

The present disclosure relates to automatic door technologies, and more particularly, to an automatic door operator and a method for driving the same.

BACKGROUND

Automatic door operators, such as door openers or door closers, are widely used in automatic door systems. With the development of automatic door technologies, conventional automatic door operators can realize more and more functions to adapt to different usage scenarios. In a typical automatic door operator, a main control circuit and a motor are generally mounted, and the automatic door operator controls the motor by using the main control circuit to achieve the purpose of forcing the door leaf to perform different switching actions. However, when the automatic door operator is in a standby state, its main control circuit will still operate and generate power consumption in order to keep receiving an external switching signal and transmitting a control command, resulting in wasting power of the automatic door operator. In addition, since the circuit is powered on for a long time, its lifetime might be reduced.

SUMMARY

In view of above, it is needed to provide an automatic door operator and a method for driving the same in regard to the problems of the power waste when the automatic door operator is in a standby state and the reduced lifetime of circuits.

An aspect of the present disclosure provides an automatic door operator, including a main control circuit, an actuating unit configured to output torque, and a transmission device, the main control circuit controlling operation of the actuating unit to drive a movement of a door leaf through the transmission device. The automatic door operator further includes: a DC power supply, configured to supply a DC voltage VDD to the main control circuit; and a standby power switching circuit, connected in series between the DC power supply and the main control circuit, and configured to acquire a switching signal and conduct, or cut off after a preset time period $\Delta t$ has been elapsed, electric current between the DC power supply and the main control circuit, according to the switching signal.

In an embodiment, the standby power switching circuit includes: a signal source sub-circuit, configured to acquire the switching signal and output a trigger level signal $V_{trigger}$ according to the switching signal, the trigger level signal $V_{trigger}$ including a first level signal and a second level signal; a delay sub-circuit, configured to receive the trigger level signal $V_{trigger}$ output from the signal source sub-circuit and output a delay level signal $V_{delay}$ according to the trigger level signal $V_{trigger}$, the delay level signal $V_{delay}$ being the first level signal when the trigger level signal $V_{trigger}$ is the first level signal, and the delay level signal $V_{delay}$ turning from the first level signal to the second level signal after the preset time period $\Delta t$ has been elapsed when the trigger level signal $V_{trigger}$ turns from the first level signal to the second level signal; a control signal sub-circuit, configured to receive the delay level signal $V_{delay}$ output from the delay sub-circuit and output a control level signal $V_{control}$ according to the delay level signal; and a DC switching sub-circuit, including a first DC voltage input terminal connected to the DC power supply, and a DC voltage output terminal connected to the main control circuit, the DC switching sub-circuit being configured to receive the control level signal $V_{control}$ output from the control signal sub-circuit and control, or cut off after the preset time period $\Delta t$ has been elapsed, electric current between the DC power supply and the main control circuit according to the control level signal $V_{control}$. The signal source sub-circuit, the delay sub-circuit, the control signal sub-circuit and the DC switching sub-circuit are connected in series sequentially.

In an embodiment, the signal source sub-circuit includes a signal generator P and a switch SW, a first terminal of the signal generator P is connected to a first terminal of the switch SW and an output terminal of the signal source sub-circuit, and a second terminal of the signal generator P is connected to a second terminal of the switch SW and grounded.

In an embodiment, the delay sub-circuit includes a first resistor R1, a first capacitor C1 and a second DC input terminal, a first terminal of the first resistor R1 is connected to a first electrode plate of the first capacitor C1 and an input and an output terminal of the delay sub-circuit, a second terminal of the first resistor R1 is connected to the second DC input, and a second electrode plate of the first capacitor C1 grounded.

In an embodiment, the controlling signal sub-circuit includes a reference voltage input terminal and an operational amplifier comparator, a positive phase input terminal of the operational amplifier comparator is connected to the reference voltage input terminal, a negative input terminal of the operational amplifier comparator is connected to an input terminal of the control signal sub-circuit, and an output terminal of the operational amplifier comparator is connected to an output terminal of the control signal sub-circuit.

In an embodiment, the DC switching sub-circuit further includes a first transistor T1 and a second transistor T2, a control terminal of the first transistor T1 is connected to an input terminal of the DC switching sub-circuit, a first terminal of the first transistor T1 is grounded, a second terminal of the first transistor T1 is connected to a control terminal of the second transistor T2, a first terminal of the second transistor T2 is connected to the first DC voltage input terminal, and a second terminal of the second transistor T2 is connected to the DC voltage output terminal.

In an embodiment, the DC switching sub-circuit further includes a second resistor R2 and a second capacitor C2, a first terminal of the second resistor R2 is connected to a first electrode plate of the second capacitor C2 and the control terminal of the second transistor T2, and a second terminal of the second resistor R2 is connected to a second electrode plate of the second capacitor C2, the first terminal of the second transistor T2 and the first DC voltage input terminal.

In an embodiment, the DC switching sub-circuit further includes a first inductor L1, a second inductor L2 and a third capacitor C3, a first terminal of the first inductor L1 is connected to the second electrode plate of the second capacitor C2, a second terminal of the first inductor L1 is connected to a first electrode plate of the third capacitor C3 and a first terminal of the second inductor L2, a second electrode plate of the third capacitor C3 is grounded, and a second terminal of the second inductor L2 is connected to the first DC voltage input terminal.

In an embodiment, the first transistor T1 is an N-type field effect transistor, and the second transistor T2 is a P-type field effect transistor.

In an embodiment, the preset time period Δt is set as equal to or greater than a length of time required for performing a complete control operation by the main control circuit.

Another aspect of the present disclosure provides a method for driving the automatic door operator described above. The method includes: acquiring the switching signal; controlling the electrical current between the DC power supply and the main control circuit to be conducted, or cut off after the preset time period Δt has been elapsed, according to the switching signal; and receiving, by the main control circuit, the DC voltage VDD supplied by the DC power supply (200), when the electrical current between the DC power supply and the main control circuit is conducted, and controlling operation of the actuating unit to drive the movement of the door leaf through the transmission device.

In an embodiment, controlling the electrical current between the DC power supply and the main control circuit to be conducted, or cut off after the preset time period Δt has been elapsed, according to the switching signal includes: determining a trigger level signal $V_{trigger}$ according to the switching signal; and controlling the electrical current between the DC power supply and the main control circuit to be conducted, or cut off after the preset time period Δt has been elapsed, according to the trigger level signal $V_{trigger}$. The electrical current between the DC power supply and the main control circuit is conducted when the trigger level signal $V_{trigger}$ is the first level signal, and the electrical current between the DC power supply and the main control circuit is cut off after the preset time period Δt has been elapsed, when the trigger level signal $V_{trigger}$ turns from the first level signal to a second level signal.

The automatic door operator and the method for driving the same according to the present disclosure provide a standby power switching circuit between the DC power supply and the main control circuit, so that the electrical current between the DC power supply and the main control circuit is cut off when the automatic door operator is in a standby state, the electrical current between the DC power supply 200 and the main control circuit 600 is conducted when receiving the switching signal in the standby state, and after the preset time period Δt from a time point where the switching signal disappears has been elapsed, the electrical current between the DC power supply 200 and the main control circuit 600 is restored to be cut off. In such a way, the purpose of saving energy and electricity is realized and the lifetime the main control circuit is increased simultaneously, in that the main control circuit is powered on only when working, and is powered off when the main control circuit is in the standby state.

DETAILED DESCRIPTION OF THE EMBODIMENTS

In order to more clearly illustrate the technical solutions of the embodiments of the present application or in the prior art, the drawings used in the embodiments will be briefly described below. Numerous specific details are set forth in the description below in order to provide a thorough understanding of the present disclosure. However, the present disclosure can be implemented in many other ways than those described herein, and those skilled in the art can make similar modifications without departing from the spirit of the disclosure, and thus the disclosure is not limited to the specific embodiments disclosed below.

It should be noted that when an element is referred to as being "arranged on" another element, it can be arranged directly on the other element or an interposing element may be present. When an element is deemed as being "connected to" another element, it can be connected directly on the other element or an interposing element may be present. The terms "vertical", "horizontal", "left", "right" and the like are used herein merely for the purpose of illustration, and are not intended to refer to an only embodiment.

All technical and scientific terms used herein have the same meaning as generally understood by those skilled in the art to which this disclosure belongs, unless otherwise defined. The terms used in the description of the present disclosure is for the purpose of describing particular embodiments and is not intended to limit the disclosure.

Figure 1:
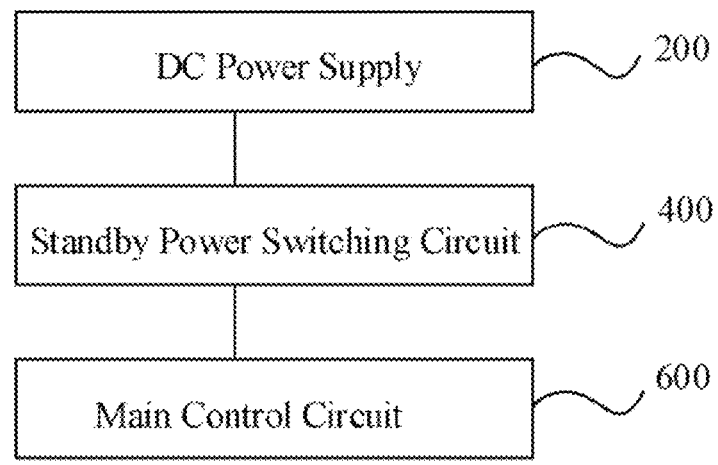
FIG. 1 shows a block diagram of an automatic door operator according to an embodiment of the present disclosure.

In an embodiment, referring to FIG. 1, provided is an automatic door operator. The automatic door operator includes a DC power supply 200, a main control circuit 600, an actuating unit, a transmission device and a standby power switching circuit 400. The standby power switching circuit 400 may be arranged between the DC power supply 200 and the main control circuit 600, and may control electrical current between the DC power supply 200 and the main control circuit 600 to be conducted or cut off according to a switching signal.

Specifically, the standby power switching circuit 400 conduct the electrical current between the DC power supply 200 and the main control circuit 600 when receiving the switching signal, that is, the DC power supply 200 may supply a DC voltage VDD to the main control circuit 600 through the standby power switching circuit 400. The main control circuit 600 enters a powered-on state upon receiving the DC voltage VDD, and performs a control operation, such as receiving a signal from a sensor, processing the signal, and/or transmitting a control signal to the actuating unit and the like. The actuating unit performs a certain driving operation upon receiving the control signal, that is, the actuating unit outputs the torque in a certain way. The torque is transmitted to the door leaf through the transmission device, so as to drive the door leaf to perform specific switching movements as desired. It should be noted that the specific switching movements herein include various door leaf swinging functions known to those skilled in the art, adapted to various application scenarios, such as door leaf positioning, door timing closure, and the like. In comparison, when the switching signal disappears, the standby power switching circuit 400 continues to maintain the electrical current between the DC power supply 200 and the main control circuit 600 to be conducted for a preset time period Δt from a time point where the switching signal disappears, and after the preset time period Δt has been elapsed, the standby power switching circuit 400 enters a cut-off state. In the cut-off state, the main control circuit 600 is powered off and returns to the standby state. The above process will be repeated once the standby power switching circuit 400 receives the switching signal again.

It should be noted that, in the above embodiment, the DC power supply 200 may be a DC output circuit or an energy storage power source (for example, a storage battery), but is not limited thereto only, as long as it may supply a DC voltage.

By connecting the standby power switching circuit 400 in series between the DC power supply 200 and the main control circuit 600, the electric current between the DC power supply 200 and the main control circuit 600 is cut off when the automatic door operator is in the standby state, the electric current between the DC power supply 200 and the main control circuit 600 is conducted when receiving the switching signal in the standby state, and after the preset time period Δt from the time point where the switching signal disappears has been elapsed, the electric current between the DC power supply 200 and the main control circuit 600 is restored to be cut off. In such a way, the purpose of saving energy and electricity is realized and the lifetime of the main control circuit 600 is increased simultaneously, in that the main control circuit 600 is powered on only when working, and is powered off when the main control circuit 600 is in the standby state.

It should be noted that in the above embodiment, the switching signal refers to a signal capable of determining the user intention to start a door leaf movement, which is detectable by various ways known to those skilled in the art, for example, sensor detecting, electromagnetic detecting in the transmission mechanism, mechanical detecting, the switch device and the like, which are not limited in the present disclosure.

Figure 2:
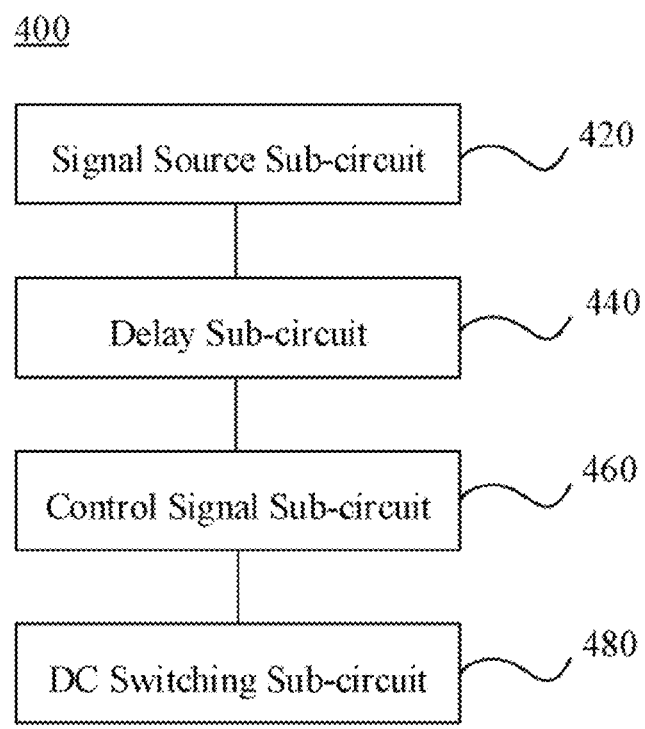
FIG. 2 shows a block diagram of a standby power switching circuit according to an embodiment of the present disclosure.

In an embodiment, referring to FIG. 2 in combination with FIG. 1, the standby power switching circuit 400 includes a signal source sub-circuit 420, a delay sub-circuit 440, a control signal sub-circuit 460 and a DC switching sub-circuit 480. The four sub-circuits are sequentially connected in series.

Specifically, the signal source sub-circuit 420 may acquire a switching signal, and output a corresponding trigger level signal $V_{trigger}$ at its output terminal according to the acquired switching signal. The trigger level signal $V_{trigger}$ may include a first level signal and a second level signal. For example, the trigger level signal $V_{trigger}$ is the first level signal when receiving the switching signal, while the trigger level signal $V_{trigger}$ turns into the second level signal when the switching signal disappears. In this embodiment, the output trigger level signal $V_{trigger}$ is a PWM signal, the first level signal is a lower level signal, and the second level signal is a higher level signal. It should be noted that the trigger level signal $V_{trigger}$ may also be in other signal types in other embodiments, without departing from the concept of the present disclosure. For example, the first level signal may be the higher level signal, and the second level signal may be the lower level signal.

Further, the input terminal of the delay sub-circuit 440 receives the trigger level signal $V_{trigger}$ output from the signal source sub-circuit 420. In the embodiment, when the trigger level signal $V_{trigger}$ is the first level signal (i.e., the lower level signal), the delay level signal $V_{delay}$ output from the output terminal of the delay sub-circuit 440 is also the first level signal. However, when the trigger level signal $V_{trigger}$ is the second level signal (i.e., the higher level signal), if the trigger level signal $V_{trigger}$ turns from the first level signal to the second level signal, the output delay level signal $V_{delay}$ turns into the second level signal after the preset time period Δt from the time point where the trigger level signal $V_{trigger}$ turns from the first level signal to the second level signal has been elapsed, thereby implementing the delay function.

Further, the control signal sub-circuit 460 receives the delay level signal $V_{delay}$ output from the output terminal of the delay sub-circuit 440, and outputs a control level signal $V_{control}$ according to the received delay level signal $V_{delay}$. The output control level signal $V_{control}$ may be the same as or different from the received delay level signal $V_{delay}$, as long as it can realize that when the standby power switching circuit 400 receives the switching signal, the output control level signal $V_{control}$ may switch on the DC switching sub-circuit 480.

Further, the DC switching sub-circuit 480 receives the control level signal $V_{control}$ output from the output terminal of the control signal sub-circuit 460, and the DC switching sub-circuit 480 is switched on or off according to the control level signal $V_{control}$, thereby correspondingly causing the electric current between the DC power supply 200 and the main control circuit 600 to be conducted or cut off.

Figure 3:
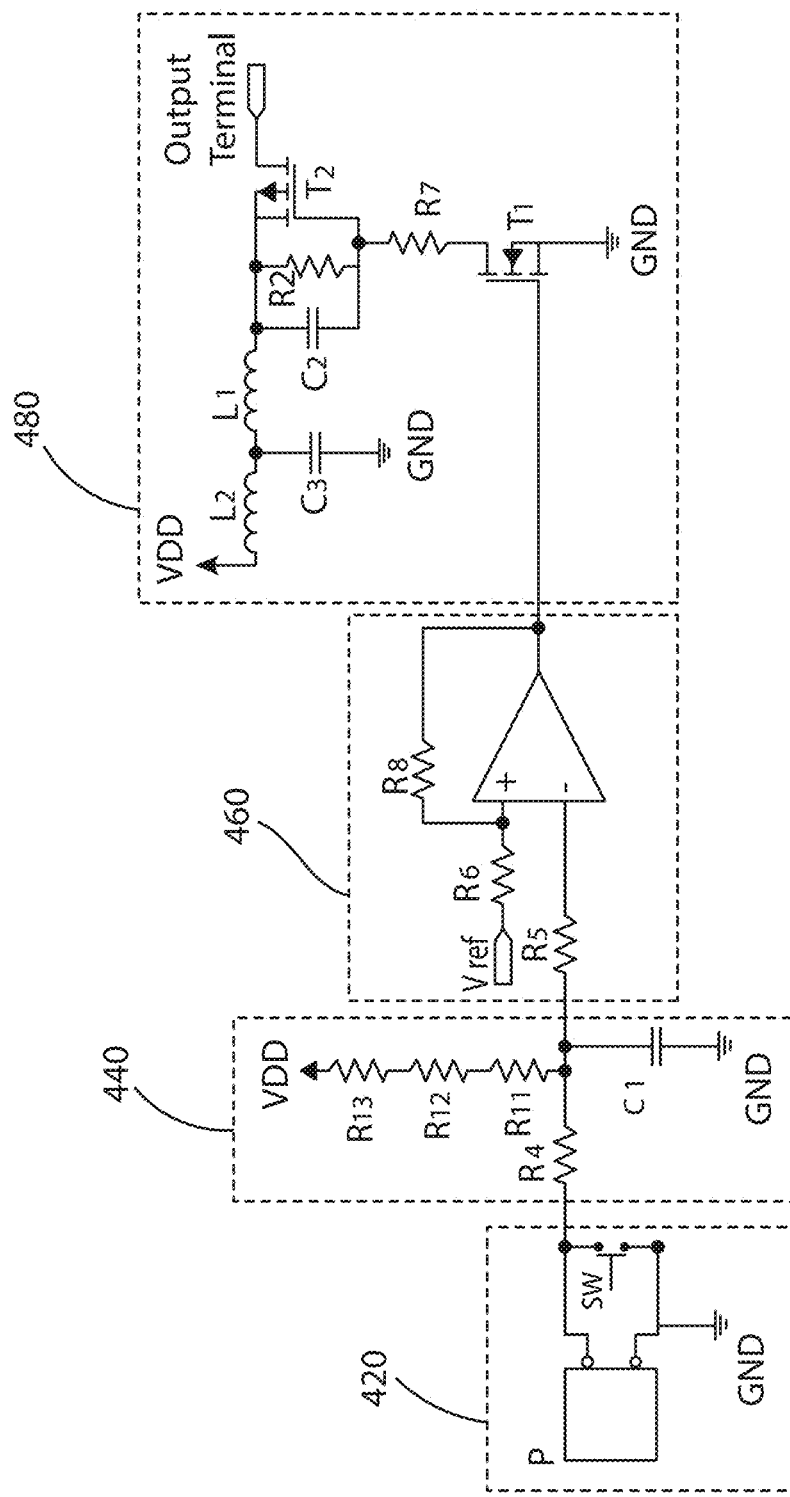
FIG. 3 shows a circuit diagram of a standby power switching circuit according to an embodiment of the present disclosure.

Below, referring to FIG. 3 in combination with FIG. 1 and FIG. 2, FIG. 3 shows an exemplary circuit diagram of the standby power switching circuit 400 according to an embodiment of the present disclosure. In this circuit diagram, the four sub-circuits arranged in series are illustrated. It should be noted that, for convenience of explanation, each of two terminals of each component in FIG. 3 are marked with a numeral "1" or "2" in italics to indicate a first terminal or a second terminal of each electronic component, but these marks should not be construed as limiting of the present disclosure.

Specifically, a signal generator P and a switch SW are arranged in the signal source sub-circuit 420. Although in this embodiment, the signal generator P is a signal generator having two pins, and the switch SW is a two-pin switch, it should be understood that the signal generator P and the switch SW may be respectively a signal generator and a switch (such as a four-pin switch and the like) in any forms, which are not to be limited herein. Continuing to refer to FIG. 3, the first terminal of the signal generator P is connected to the first terminal of the switch SW and the output terminal of the signal source sub-circuit 420. The second terminal of the signal generator P is connected to the second terminal of the switch SW and grounded. In such a way, if the switch SW is pressed or the signal generator P generates a corresponding lower level signal, the signal source sub-circuit 420 outputs then the lower level signal as the trigger level signal $V_{trigger}$, or conversely outputs a higher level signal as the trigger level signal $V_{trigger}$.

In this embodiment, the delay sub-circuit 440 is an RC delay circuit, including resistors R11, R12, R13, a first capacitor C1, a current limiting resistor R4 and a second DC input terminal. The first terminal of the current limiting resistor R4 is connected to the input terminal of the delay sub-circuit 440. The second terminal of the current limiting resistor R4 is connected to the first terminal of the resistor R11, the first electrode plate of the first capacitor C1 and the output terminal of the delay sub-circuit 440. The second electrode plate of the first capacitor C1 is grounded.

The resistors R11, R12, R13 are connected in series sequentially, and the second terminal of the resistor R13 is connected to the second DC input terminal.

It should be understood that the delay sub-circuit 440 of the present disclosure is not limited to the RC delay circuit in this embodiment, and those skilled in the art should be aware of other types of delay circuits as long as they can implement that a change in the level signal from the input terminal of the delay sub-circuit 440 may result in a corresponding delayed change in the level signal at its output terminal.

Continuing to refer to FIG. 3, the control signal sub-circuit 460 includes an operational amplifier comparator, a reference voltage input terminal and current limiting resistors R5 and R6. The operational amplifier comparator further includes a positive feedback resistor R8. The reference voltage input terminal is connected to the first terminal of the current limiting resistor R6 to provide a reference voltage $V_{ref}$. The input terminal of the control signal sub-circuit 460 is connected to the first terminal of the current limiting resistor R5. The second terminal of the current limiting resistor R5 is connected to the negative phase input terminal of the operational amplifier comparator. The positive phase input terminal of the operational amplifier comparator is connected to the second terminal of the current limiting resistor R6 and the second terminal of the positive feedback resistor R8. The output terminal of the operational amplifier comparator is connected to the first terminal of the positive feedback resistor R8 and the output terminal of the control signal sub-circuit 460. In other embodiments, the operational amplifier comparator may also be replaced with a voltage comparator.

Furthermore, it should be noted that the control signal sub-circuit 460 in this embodiment may also be a circuit in other forms, as long as the circuit can output a corresponding control level signal $V_{control}$ according to the magnitude of the delay level signal $V_{delay}$ received from the input terminal of the circuit. For example, in another embodiment, the operational amplifier comparator may be replaced with a diode, so that the anode of the diode is connected to the input terminal of the control signal sub-circuit 460, and the cathode of the diode is connected to the output terminal of the control signal sub-circuit 460. In this embodiment, when the level signal received from the input terminal of the control signal sub-circuit 460 exceeds a turn-on voltage of the diode, the diode is then turned on, such that the output terminal of the control signal sub-circuit 460 outputs the corresponding control level signal $V_{control}$.

Continuing to refer to FIG. 3, the DC switching sub-circuit 480 includes a first transistor T1, a second transistor T2, a second resistor R2, a second capacitor C2, a first inductor L1, a second inductor L2, a third capacitor C3, a second DC input terminal, a DC voltage output terminal and a current limiting resistor R7. The input terminal of the DC switching sub-circuit 480 is connected to the control terminal of the first transistor T1. The first terminal of the first transistor T1 is grounded, and the second terminal of the first transistor T1 is connected to the first terminal of the current limiting resistor R7. The second terminal of the current limiting resistor R7 is connected to the control terminal of the second transistor T2, the first terminal of the second resistor R2 and the first electrode plate of the second capacitor C2. The second terminal of the second transistor T2 is connected to the DC voltage output terminal. The first terminal of the second transistor T2 is connected to the second terminal of the second resistor R2, the second electrode plate of the second capacitor and the first terminal of the first inductor L1. The second terminal of the first inductor L1 is connected to the first electrode plate of the third capacitor C3 and the first terminal of the second inductor L2. The second electrode plate of the third capacitor C3 is grounded. The second terminal of the second inductor L2 is connected to the first DC voltage input terminal. In this embodiment, the first transistor T1 is an N-type field effect transistor (for example, an N-type field effect transistor of the type DMP6023LSS), and the second transistor T2 is a P-type field effect transistor (for example, a P-type field effect transistor of the type DMN65D8L). However, it should be understood that in other embodiments, the first transistor T1 and the second transistor T2 may also be in other combinations of transistor types, as long as the combination thereof may realize that the switching on and off of the second transistor T2 may be controlled by the switching on and off of the first transistor T1. The second resistor R2 and the second capacitor C2, and the first inductor L1, the second inductor L2 and the third capacitor C3 respectively constitute a filter circuit.

Figure 4:
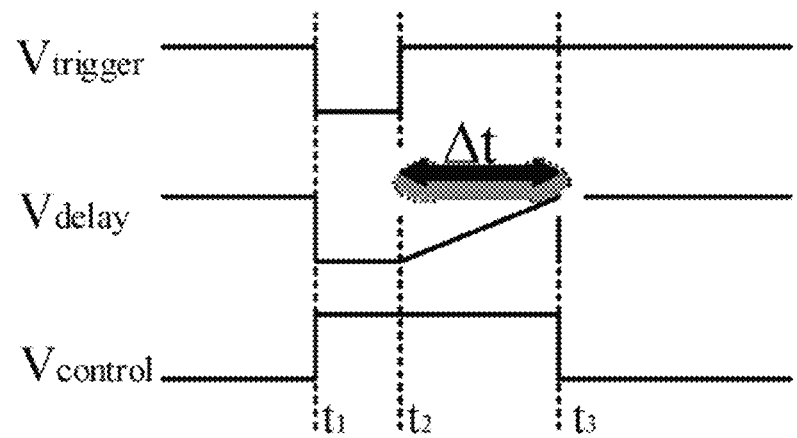
FIG. 4 shows a timing diagram of level signals according to the standby power switching circuit in FIG. 3.

Below, referring to FIG. 4 in combination with FIG. 3, FIG. 4 shows a timing diagram of level signals according to the standby power switching circuit in FIG. 3. In this timing diagram, the level changing relationship of the trigger level signal $V_{trigger}$, the delay level signal $V_{delay}$ and the control level signal $V_{control}$ over time is shown.

As shown in FIG. 4, when the signal source sub-circuit 420 receives the switching signal at time t1, the output terminal of the signal source sub-circuit 420 is then at a lower level. In other words, at time t1, the trigger level signal $V_{trigger}$ outputs a PWM lower level signal as a trigger level signal $V_{trigger}$, where the PWM lower level signal has a pulse duration of t2-t1. During this pulse duration, since the signal source sub-circuit 420 is grounded, the first terminal of the first capacitor C1 is at a low level, thereby the delay level signal $V_{delay}$ output from the output terminal of the delay sub-circuit 440 is also at a low level. The negative phase input terminal of the operational amplifier comparator in the control signal sub-circuit 460 is then also at a low level. Since the positive phase input terminal of the operational amplifier comparator is connected to the reference voltage $V_{ref}$, while the reference voltage $V_{ref}$ is configured to be higher than the lower level of the negative phase input, the output terminal of the operational amplifier comparator outputs then the control level signal $V_{control}$ at a higher level. The control signal level $V_{control}$ at the higher level is output to the control terminal of the first transistor T1 which is an N-type field effect transistor, resulting in switching on the first transistor T1. Further, since the first transistor T1 is switched on, the control terminal of the second transistor T2 is then at a lower level. Consequently, the second transistor T2 which is a P-type field effect transistor is switched on, that is, the electric current between the DC power supply 200 and the main control circuit 600 is conducted.

On other hand, as shown in FIG. 4, from the time t2 where the trigger level signal $V_{trigger}$ turns from the lower level back to the higher level, the delay level signal $V_{delay}$ gradually changes from the lower level to the higher level within the preset time period $\Delta t$ from the time t2, while the control level signal $V_{control}$ remains at the higher level. After the preset time period $\Delta t$ has been elapsed, the delay level signal $V_{delay}$ reaches the higher level as well, while at this time the control level signal $V_{control}$ turns to a lower level. Specifically, when the trigger level signal $V_{trigger}$ from the output terminal of the signal source sub-circuit 420 is at the higher level, due to the presence of the first capacitor C1 for storing energy, the delay level signal $V_{delay}$ output from the output terminal of the delay sub-circuit 440 gradually increases from the lower level to the higher level within the preset time period Δt until it reaches the higher level at time t3. At this time, the voltage value at the negative phase input terminal of the operational amplifier comparator is greater than the reference voltage $V_{ref}$, so that the output terminal of the operational amplifier comparator outputs the control level signal $V_{control}$ at the lower level, which results in switching off the first transistor T1, thereby resulting in switching off the second transistor T2. It should be noted that in an embodiment, the preset time period Δt can be set to be equal to or greater than a length of time required for performing a complete control operation by the main control circuit. For example, when the main control circuit needs 25 seconds to perform a door opening operation or a door closing operation, the preset timeperiod Δt may be set to 30 seconds to ensure the door opening operation or door closing operation to be operable.

Figure 5:
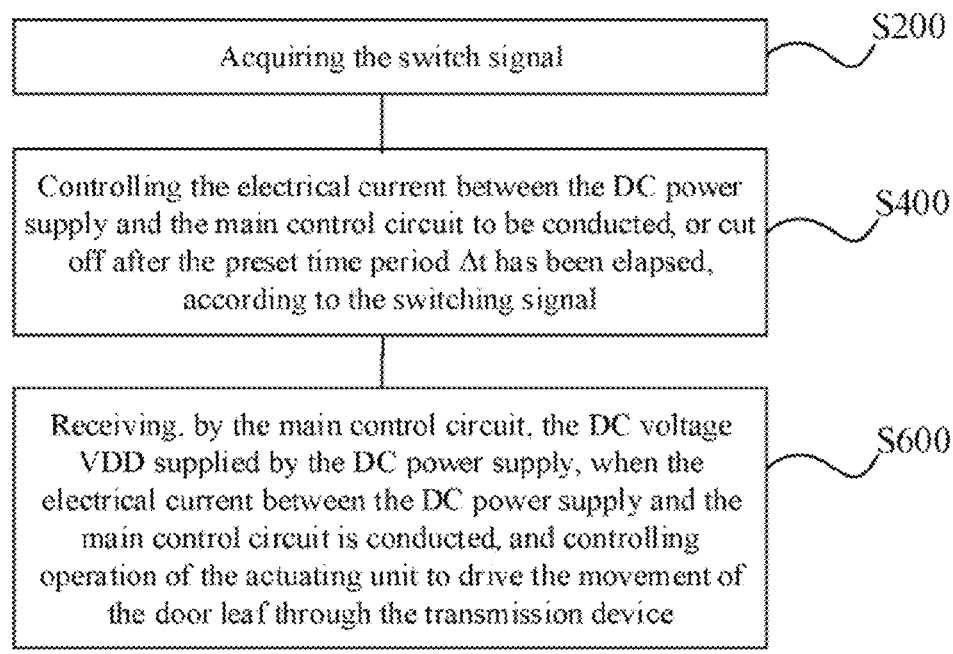
FIG. 5 shows a block diagram of a method for driving an automatic door operator according to an embodiment of the present disclosure.
Figure 6:
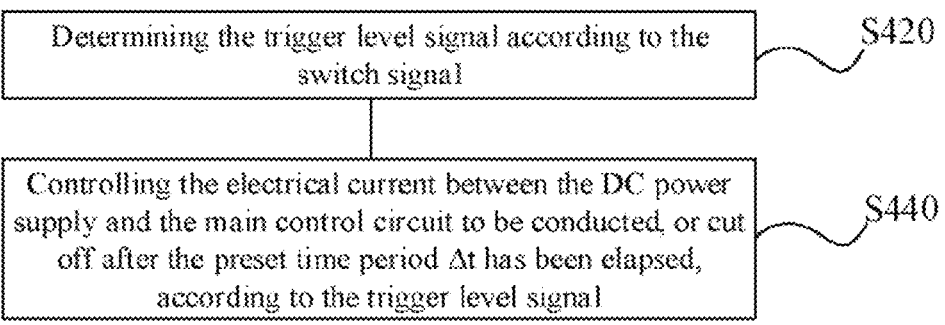
FIG. 6 shows a block diagram of the method for driving an automatic door operator according to another embodiment of the present disclosure.

Referring to FIG. 5 and FIG. 6, FIG. 5 shows a block diagram of a method for driving the automatic door operator described above according to an embodiment of the present disclosure, and FIG. 6 shows a block diagram of a method for driving the automatic door operator described above according to another embodiment of the present disclosure. The method for driving the automatic door operator provided by this embodiment includes the following steps.

At the step S200, a switching signal is acquired.

As described above, the switching signal may be acquired in various ways known to those skilled in the art including, but not limited to, mechanical, electromechanical, and sensor technologies.

At the step S400, the electrical current between the DC power supply 200 and the main control circuit 600 is controlled to be conducted, or cut off after the preset time period Δt has been elapsed, according to the switching signal.

When the automatic door operator receives the switching signal, the electrical current between the DC power supply 200 and the main control circuit 600 is conducted, and when the switching signal disappears, the electrical current between the DC power supply 200 and the main control circuit 600 is cut off after the preset time period Δt has been elapsed. Specifically, this step may further include steps S420 and S440 below.

At the step 420, a trigger level signal $V_{trigger}$ is determined according to the switching signal. As described above, the switching signal is converted into a PWM level signal, based on which the trigger level signal $V_{trigger}$ is determined to conduct or cut off the electrical current between the DC power supply 200 and the main control circuit 600.

At the step S440, the electrical current between the DC power supply 200 and the main control circuit 600 is controlled to be conducted, or cut off after the preset time period Δt has been elapsed, according to the trigger level signal $V_{trigger}$. The electrical current between the DC power supply 200 and the main control circuit 600 is conducted when the trigger level signal $V_{trigger}$ is a first level signal, while the electrical current between the DC power supply 200 and the main control circuit 600 is cut off after the preset time period Δt has been elapsed when the trigger level signal $V_{trigger}$ turns from the first level signal to a second level signal.

This step has been described in detail above and will not be described here again.

At the step S600, when the electrical current between the DC power supply 200 and the main control circuit 600 is conducted, the main control circuit 600 receives the DC voltage VDD supplied by the DC power supply 200, and controls the operation of the actuating unit to drive the movement of the door leaf through the transmission device.

As described above, when the main control circuit 600 receives the DC voltage VDD supplied by the DC power supply 200, it may perform the control processes such as receiving a signal, processing the signal, and/or sending a control signal to the actuating unit so as to control the actuating unit to operate in a specific manner, so that the actuating unit drives the door leaf through the transmission device to implement a certain movement according to the instruction of the control signal.

All of the technical features in the above-described embodiments may be employed in arbitrary combinations. For the brevity of description, not all possible combinations of the technical features illustrated above are described herein. However, as long as such contradictions of the technical features are not contradictory, they should be considered as within the scope of the disclosure in the specification.

The forgoing embodiments are merely illustrative of several implementations of the present disclosure, and the description thereof is more specific and detailed, but should not be construed as limitations to the scope of the present disclosure. It should be noted that for those of ordinary skill in the art, variations and improvements can be made without departing from the concept of the present disclosure, which fall within the scope of the present disclosure. Therefore, the scope of the present disclosure is defined by the appended claims.

What is claimed is:

1. An automatic door operator, comprising a main control circuit, an actuating unit configured to output torque, and a transmission device, the main control circuit controlling operation of the actuating unit to drive a movement of a door leaf through the transmission device, the automatic door operator further comprising:
    a DC power supply, configured to supply a DC voltage VDD to the main control circuit; and
    a standby power switching circuit, connected in series between the DC power supply and the main control circuit, and configured to acquire a switching signal and conduct, or cut off after a preset time period Δt has been elapsed, electric current between the DC power supply and the main control circuit, according to the switch signal, wherein during the preset time period At following the acquired switching signal the actuating unit outputs torque to move the door leaf through a door opening operation or a door closing operation.

2. An automatic door operator, comprising a main control circuit, an actuating unit configured to output torque, and a transmission device, the main control circuit controlling operation of the actuating unit to drive a movement of a door leaf through the transmission device, the automatic door operator further comprising:
    a DC power supply, configured to supply a DC voltage VDD to the main control circuit and
    a standby power switching circuit, connected in series between the DC power supply and the main control circuit, and configured to acquire a switching signal and conduct, or cut off after a preset time period ∆t has been elapsed, electric current between the DC power supply and the main control circuit, according to the switch signal, wherein the standby power switching circuit comprises:

a signal source sub-circuit, configured to acquire the switching signal and output a trigger level signal Vtrigger according to the switching signal, the trigger level signal Vtrigger comprising a first level signal and a second level signal;

a delay sub-circuit, configured to receive the trigger level signal Vtrigger output from the signal source sub-circuit and output a delay level signal Vdelay according to the trigger level signal Vtrigger, wherein the delay level signal Vdelay is the first level signal, when the trigger level signal Vtrigger is the first level signal, and the delay level signal Vdelay turns from the first level signal to the second level signal after the preset time period ∆t has been elapsed, when the trigger level signal Vtrigger turns from the first level signal to the second level signal;

a control signal sub-circuit configured to receive the delay level signal Vdelay output from the delay sub-circuit and output a control level signal Vcontrol according to the delay level signal Vdelay; and a DC switching sub-circuit, comprising a first DC voltage input terminal connected to the DC power supply, and a DC voltage output terminal connected to the main control circuit, wherein the DC switching sub-circuit configured to receive the control level signal Vcontrol output from the control signal sub-circuit and conduct, or cut off after the preset time period ∆t has been elapsed, electric current between the DC power supply and the main control circuit according to the control level signal Vcontrol, wherein the signal source sub-circuit, the delay sub-circuit, the control signal sub-circuit and the DC switching sub-circuit are connected in series and sequentially.

3. The automatic door operator according to claim 2, wherein the signal source sub-circuit comprises a signal generator P and a switch SW, a first terminal of the signal generator P is connected to a first terminal of the switch SW and an output terminal of the signal source sub-circuit, and a second terminal of the signal generator P is connected to a second terminal of the switch SW and grounded.

4. The automatic door operator according to claim 2, wherein the delay sub-circuit comprises a first resistor R1, a first capacitor C1 and a second DC input terminal, a first terminal of the first resistor R1 is connected to a first electrode plate of the first capacitor C1 and an input terminal and an output terminal of the delay sub-circuit, a second terminal of the first resistor R1 is connected to the second DC input terminal, and a second electrode plate of the first capacitor C1 is grounded.

5. The automatic door operator according to claim 2, wherein the controlling signal sub-circuit comprises a reference voltage input terminal and an operational amplifier comparator, a positive phase input terminal of the operational amplifier comparator is connected to the reference voltage input terminal, a negative input terminal of the operational amplifier comparator is connected to an input terminal of the control signal sub-circuit, and an output terminal of the operational amplifier comparator is connected to an output terminal of the control signal sub-circuit.

6. The automatic door operator according to claim 2, wherein the DC switching sub-circuit further comprises a first transistor T1 and a second transistor T2, a control terminal of the first transistor T1 is connected to an input terminal of the DC switching sub-circuit, a first terminal of the first transistor T1 is grounded, a second terminal of the first transistor T1 is connected to a control terminal of the second transistor T2, a first terminal of the second transistor T2 is connected to the first DC voltage input terminal, and a second terminal of the second transistor T2 is connected to the DC voltage output terminal.

7. The automatic door operator according to claim 6, wherein the DC switching sub-circuit further comprises a second resistor R2 and a second capacitor C2, a first terminal of the second resistor R2 is connected to a first electrode plate of the second capacitor C2 and the control terminal of the second transistor T2, and a second terminal of the second resistor R2 is connected to a second electrode plate of the second capacitor C2, the first terminal of the second transistor T2 and the first DC voltage input terminal.

8. The automatic door operator according to claim 7, wherein the DC switching sub-circuit further comprises a first inductor L1, a second inductor L2 and a third capacitor C3, a first terminal of the first inductor L1 is connected to the second electrode plate of the second capacitor C2, a second terminal of the first inductor L1 is connected to a first electrode plate of the third capacitor C3 and a first terminal of the second inductor L2, a second electrode plate of the third capacitor C3 is grounded, and a second terminal of the second inductor L2 is connected to the first DC voltage input terminal.

9. The automatic door operator according to claim 6, wherein the first transistor T1 is an N-type field effect transistor, and the second transistor T2 is a P-type field effect transistor.

10. A method for driving the automatic door operator according to claim 2, comprising:

acquiring the switching signal;

controlling the electrical current between the DC power supply and the main control circuit to be conducted, or cut off after the preset time period ∆t has been elapsed, according to the switching signal; and receiving, by the main control circuit, the DC voltage VDD supplied by the DC power supply, when the electrical current between the DC power supply and the main control circuit is conducted, and controlling operation of the actuating unit to drive the movement of the door leaf through the transmission device.

11. The method according to claim 10, wherein controlling the electrical current between the DC power supply and the main control circuit to be conducted, or cut off after the preset time period 66 t has been elapsed, according to the switching signal comprises:

determining the trigger level signal Vtrigger according to the switching signal; and controlling the electrical current between the DC power supply and the main control circuit to be conducted, or cut off after the preset time period ∆t has been elapsed, according to the trigger level signal Vtrigger, wherein:

the electrical current between the DC power supply and the main control circuit is conducted when the trigger level signal Vtrigger is the first level signal; and the electrical current between the DC power supply and the main control circuit is cut off after the preset time period Δt has been elapsed, when the trigger level signal Vtrigger turns from the first level signal to a second level signal.

* * * * *